United States Patent
Angermann et al.

(10) Patent No.: US 11,220,144 B2
(45) Date of Patent: Jan. 11, 2022

(54) TRAILER COUPLING HAVING A TENSION ANCHOR

(71) Applicant: WESTFALIA-AUTOMOTIVE GMBH, Rheda-Wiedenbrück (DE)

(72) Inventors: Kay Angermann, Döbeln (DE); Hendrik Graute, Rietberg (DE); Raphael Gringel, Bielefeld (DE); Arne Kuhlen, Ennigerloh (DE)

(73) Assignee: WESTFALIA-AUTOMOTIVE GMBH

( * ) Notice: Subject to any disclaimer, the term of this patent is extended or adjusted under 35 U.S.C. 154(b) by 293 days.

(21) Appl. No.: 16/333,618

(22) PCT Filed: Sep. 27, 2017

(86) PCT No.: PCT/EP2017/074456
§ 371 (c)(1),
(2) Date: Mar. 15, 2019

(87) PCT Pub. No.: WO2018/060227
PCT Pub. Date: Apr. 5, 2018

(65) Prior Publication Data
US 2019/0225039 A1    Jul. 25, 2019

(30) Foreign Application Priority Data

Sep. 30, 2016   (DE) .................... 10 2016 118 677.5
Dec. 15, 2016   (DE) .................... 10 2016 124 562.3

(51) Int. Cl.
*B60D 1/48*   (2006.01)
*B60D 1/54*   (2006.01)
*B60D 1/06*   (2006.01)

(52) U.S. Cl.
CPC ............... *B60D 1/485* (2013.01); *B60D 1/54* (2013.01); *B60D 1/06* (2013.01); *B60D 2001/544* (2013.01)

(58) Field of Classification Search
CPC ..................... B60D 1/485; B60D 2001/544
See application file for complete search history.

(56) References Cited

U.S. PATENT DOCUMENTS

| | | |
|---|---|---|
| 3,436,100 A | 4/1969 | Abromavage |
| 4,607,858 A | 8/1986 | Wagner |

(Continued)

FOREIGN PATENT DOCUMENTS

| | | |
|---|---|---|
| DE | 7325210 U | 11/1973 |
| DE | 10041063 | 5/2001 |

(Continued)

OTHER PUBLICATIONS

International Searching Authority, European Patent Office, Written Opinion for PCT/EP2017/074456, dated Dec. 20, 2017.

(Continued)

*Primary Examiner* — Kevin Hurley
(74) *Attorney, Agent, or Firm* — McDonald Hopkins LLC

(57) ABSTRACT

The disclosure relates to a trailer coupling for a motor vehicle, comprising a carrier assembly having a transverse carrier for arranging on the rear of a motor vehicle and a retainer retained on the transverse carrier for retaining a coupling element of the trailer coupling, wherein the coupling element is provided for fastening a trailer, wherein the retainer is connected to the transverse carrier by a tension anchor of a tension anchor assembly wherein the tension anchor penetrates the transverse carrier along the tension anchor load axis of the tension anchor and loads an abutment surface of the retainer, through which abutment surface the tension anchor load axis or an axis parallel thereto passes, (Continued)

against the transverse carrier. Further, the retainer has at least one side support surface, which projects in front of the abutment surface adjacent to the tension anchor and lies against the transverse carrier such that the retainer is supported on the transverse carrier laterally adjacent to the tension carrier with respect to a force acting transversely to the tension anchor load axis of the tension anchor.

28 Claims, 7 Drawing Sheets

(56) References Cited

U.S. PATENT DOCUMENTS

| | | | | |
|---|---|---|---|---|
| 6,604,884 | B1 | 8/2003 | Ohkura | |
| 7,021,646 | B1* | 4/2006 | Cheng | B60D 1/485 |
| | | | | 280/493 |
| 7,100,936 | B1* | 9/2006 | Cheng | B60D 1/485 |
| | | | | 280/491.5 |
| 9,738,126 | B2* | 8/2017 | Mantovani | B60D 1/485 |
| 2011/0031718 | A1* | 2/2011 | Parma | B60D 1/44 |
| | | | | 280/504 |
| 2012/0292930 | A1 | 11/2012 | Hermanson | |
| 2018/0222263 | A1* | 8/2018 | Kadnikov | B60D 1/246 |
| 2019/0225039 | A1* | 7/2019 | Angermann | B60D 1/54 |
| 2020/0016946 | A1* | 1/2020 | Fabiano | B60D 1/485 |
| 2020/0180373 | A1* | 6/2020 | Lee | B60D 1/485 |
| 2020/0324596 | A1* | 10/2020 | Belinky | B60D 1/155 |

FOREIGN PATENT DOCUMENTS

| | | | | |
|---|---|---|---|---|
| DE | 102006045465 | | 12/2007 | |
| DE | 102008047547 | | 3/2010 | |
| DE | 10212022614 | | 5/2014 | |
| DE | 102012022614 | B3 | 5/2014 | |
| DE | 102013018771 | | 5/2015 | |
| DE | 202015104491 | U1 * | 11/2016 | B60D 1/06 |
| EP | 2596966 | A1 * | 5/2013 | B60D 1/52 |
| EP | 2803509 | A1 | 11/2014 | |
| EP | 2808184 | A1 * | 12/2014 | B60D 1/52 |
| EP | 2808184 | A1 | 12/2014 | |
| EP | 3135511 | A1 | 3/2017 | |
| EP | 3150410 | A1 * | 4/2017 | B60D 1/06 |
| FR | 2909948 | | 6/2008 | |
| KR | 102109429 | B1 * | 5/2020 | |
| WO | 2006065117 | A1 | 6/2006 | |

OTHER PUBLICATIONS

International Bureau of WIPO, International Preliminary Report on Patentability for PCT/EP2017/074456, dated Apr. 2, 2019.
Translation of International Search Report; International Application No. PCT/EP2017/074456 dated Dec. 20, 2017 ISA/EP.

\* cited by examiner

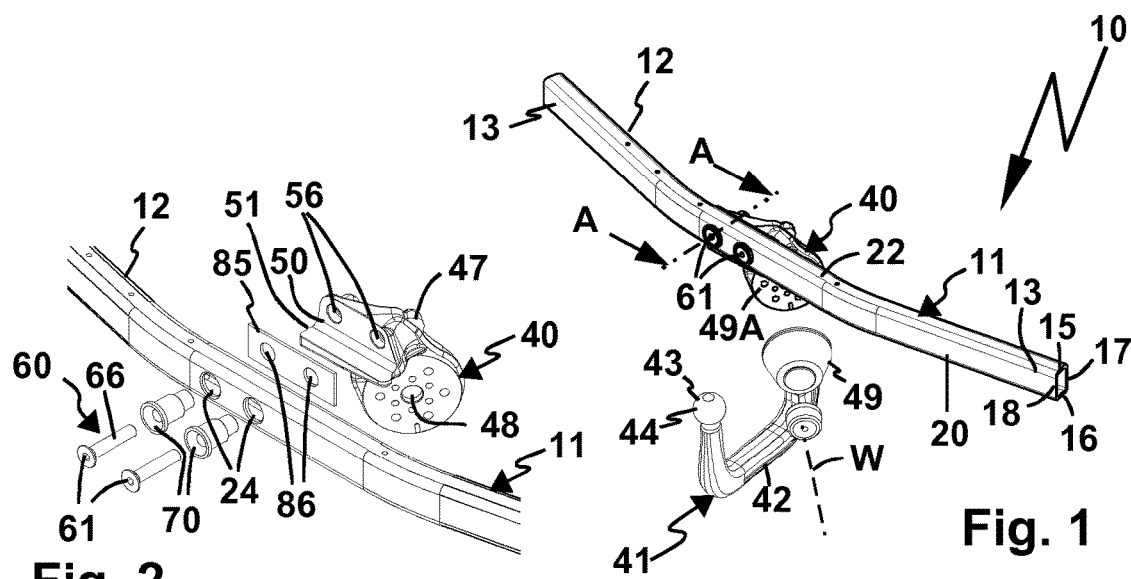

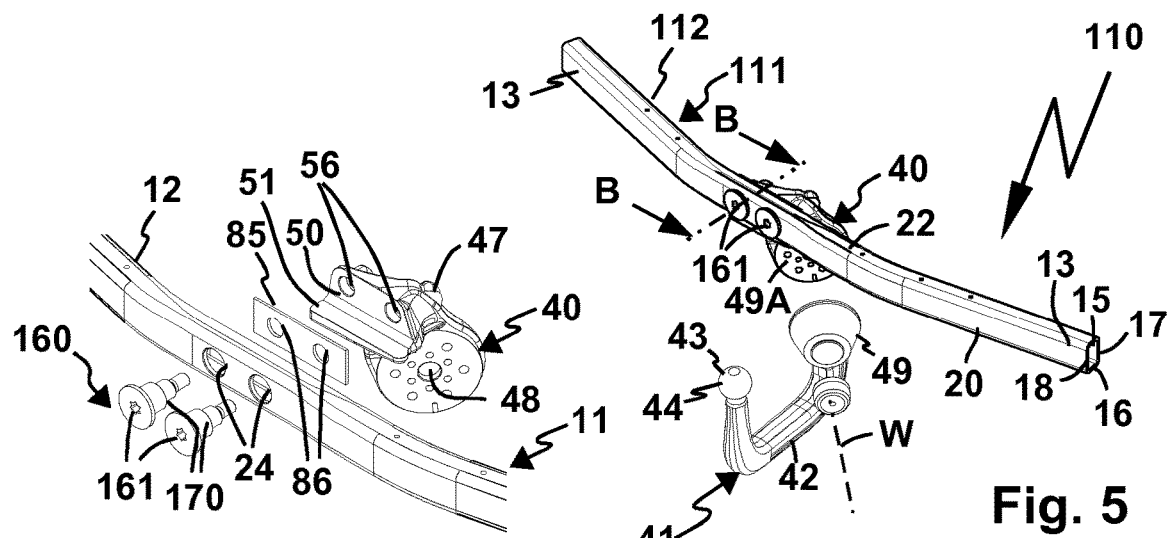
Fig. 5
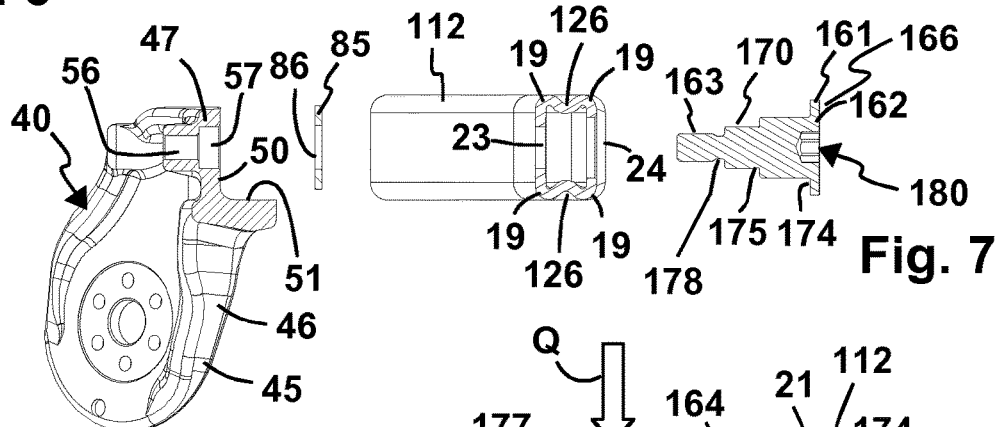
Fig. 6
Fig. 7
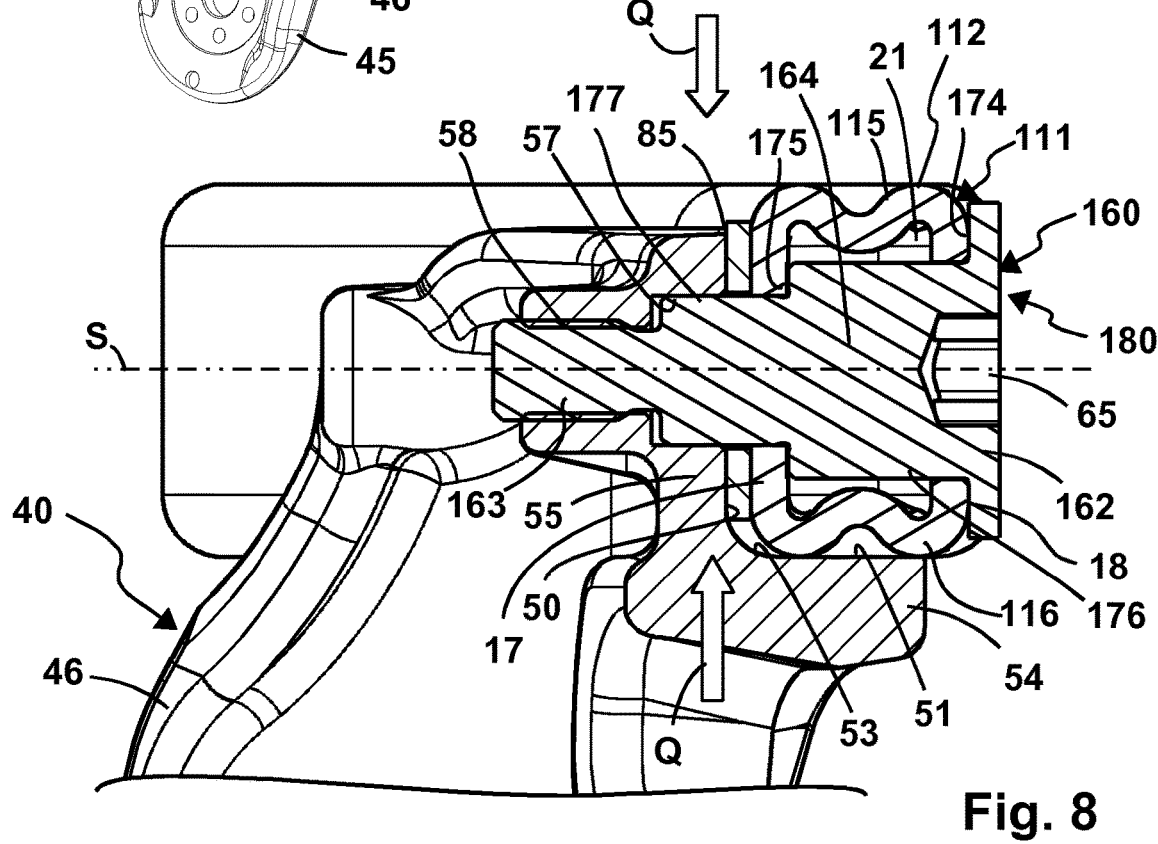
Fig. 8

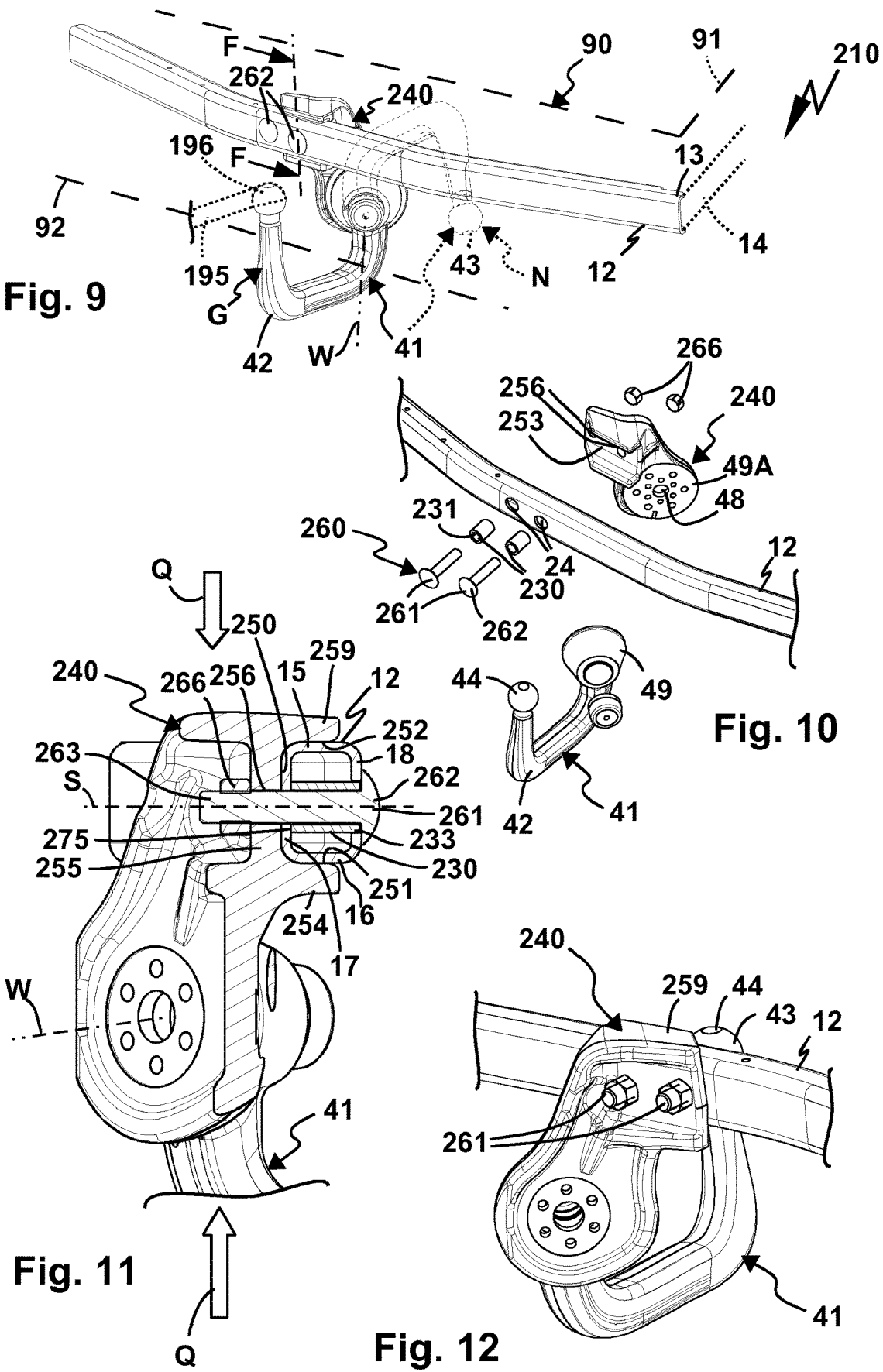

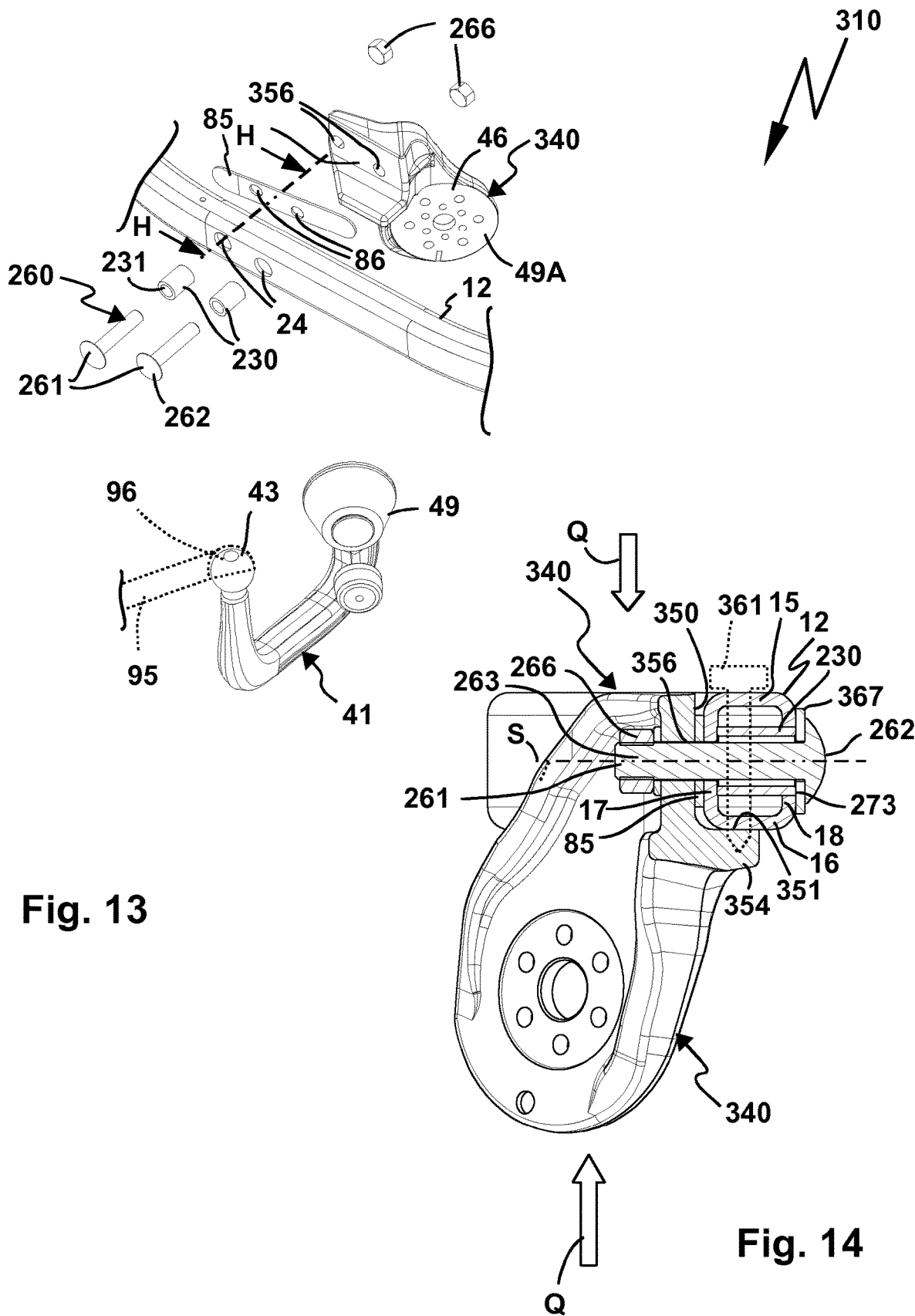

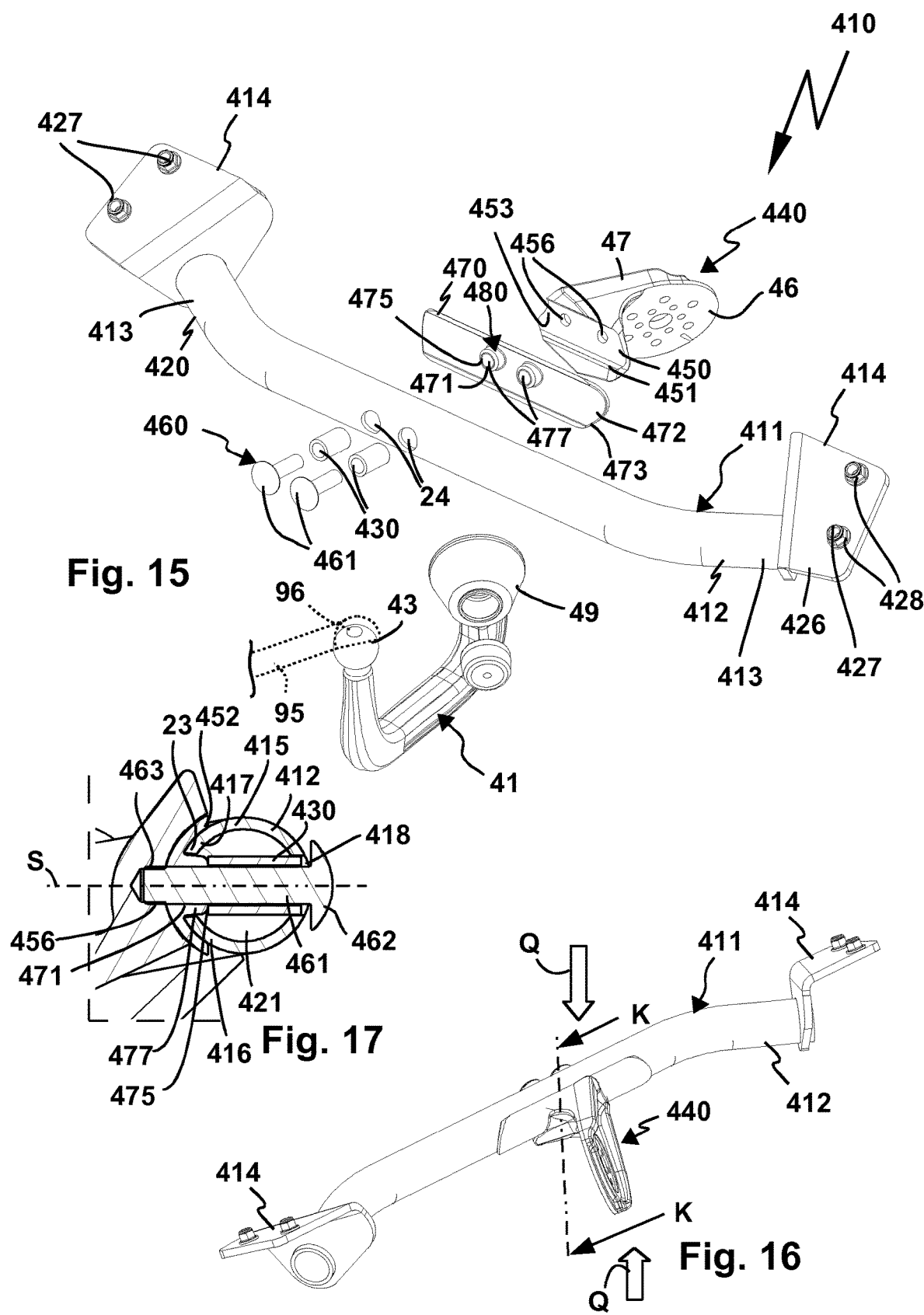

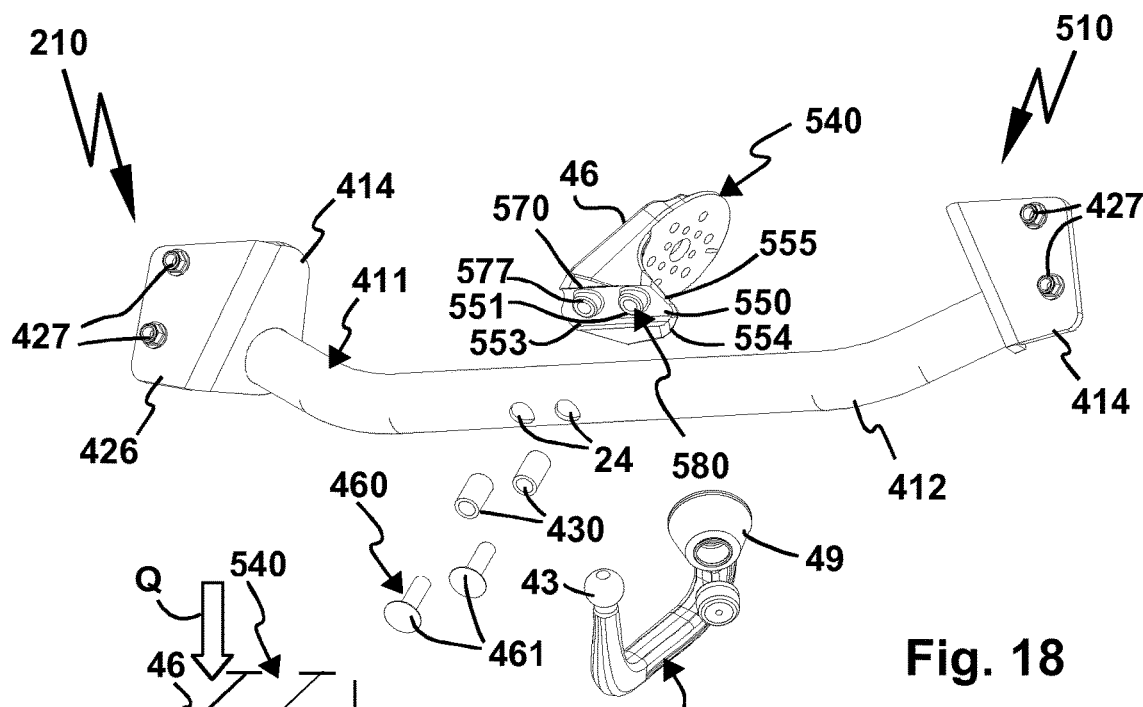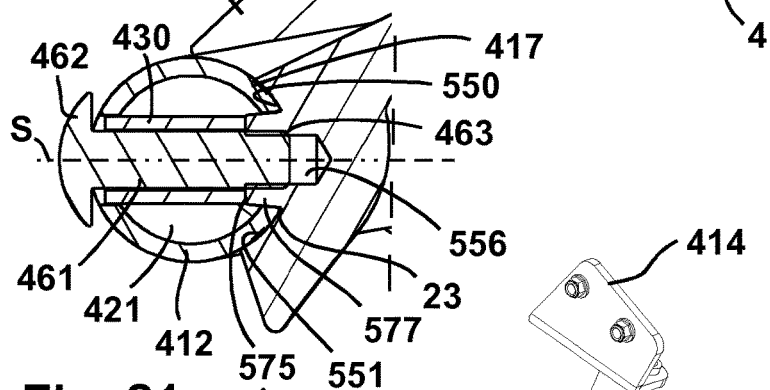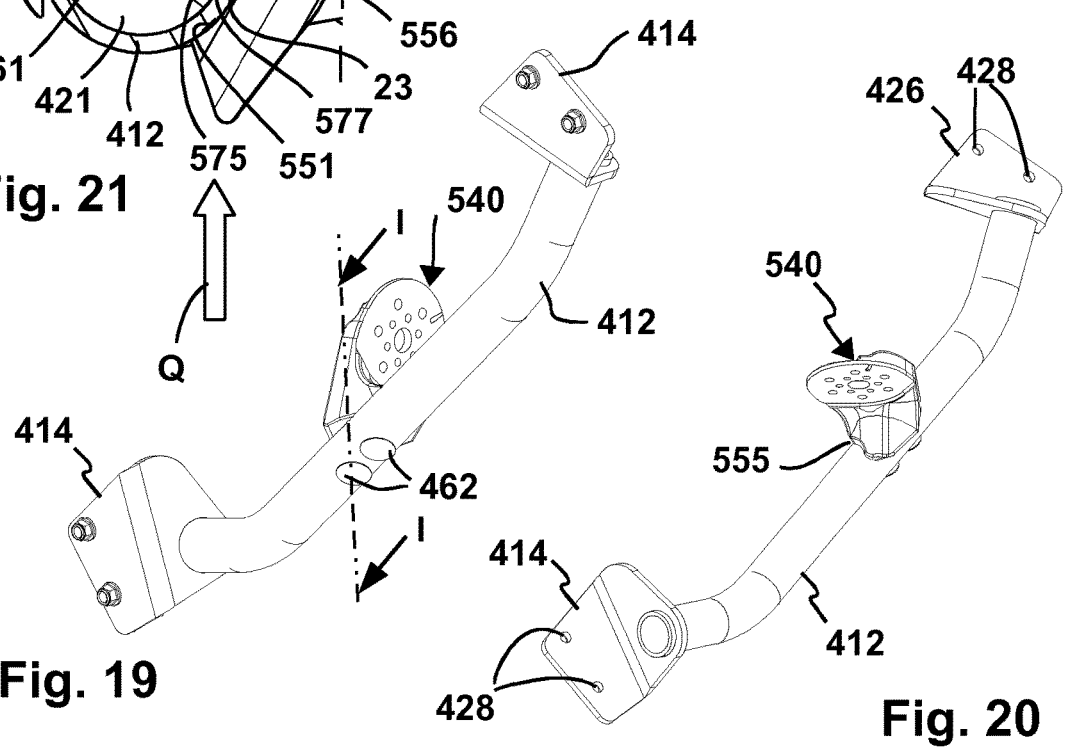

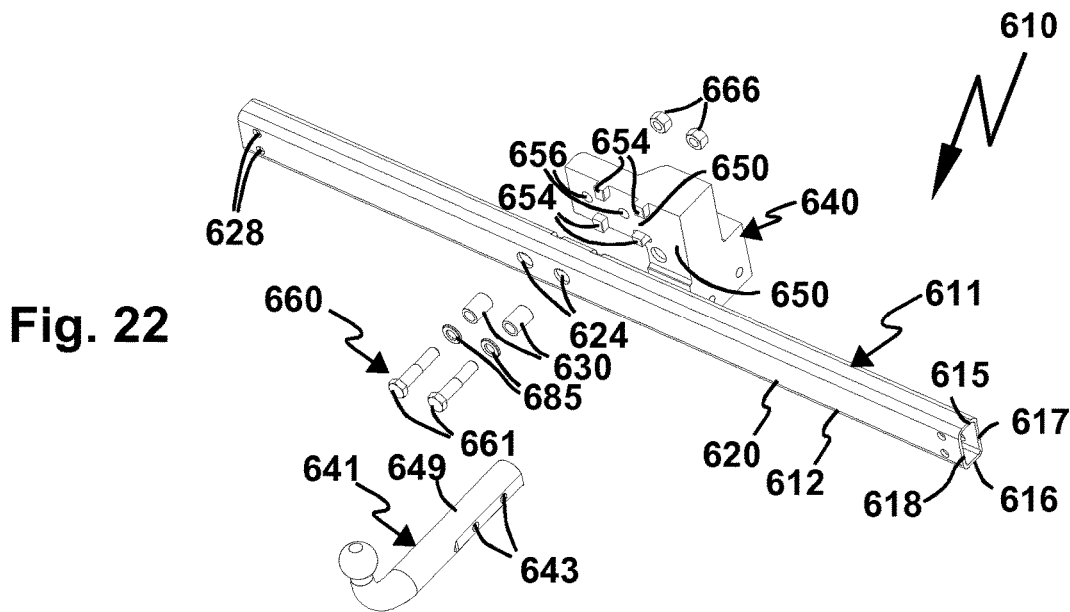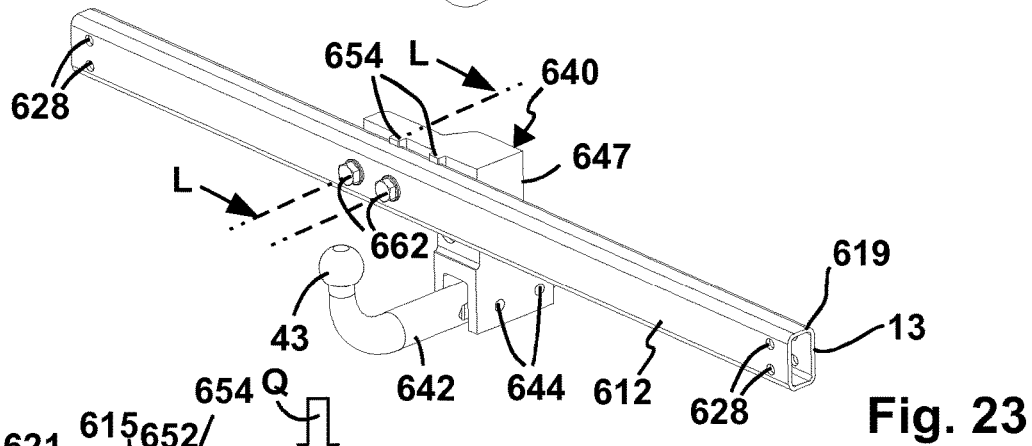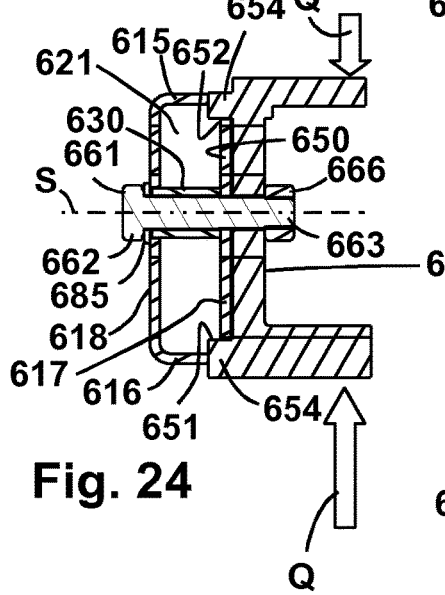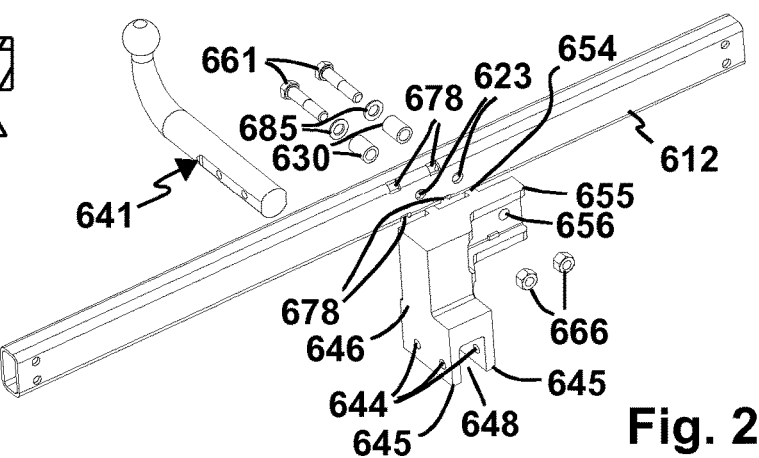

TRAILER COUPLING HAVING A TENSION ANCHOR

CROSS-REFERENCE TO RELATED APPLICATION

This application is a 35 U.S.C. § 371 national stage application of PCT Application No. PCT/EP2017/074456 filed on Sep. 27, 2017, entitled "TRAILER COUPLING HAVING A TENSION ANCHOR," which claims priority to German Patent Application No. 102016118677.5 filed on Sep. 30, 2016, and German Patent Application No. 102016124562.3 filed Dec. 15, 2016, each of which are incorporated herein in their entirety by reference.

The invention relates to a trailer coupling for a motor vehicle comprising a carrier assembly, which has a transverse carrier for arranging on the rear of a motor vehicle and a retainer retained on the transverse carrier for retaining a coupling element, in particular a coupling arm, of the trailer coupling, with the coupling element being provided for fastening a trailer or a load carrier, with the retainer being connected to the transverse carrier by means of a tension anchor of a tension anchor assembly, in particular a screw, with the tension anchor penetrating the transverse carrier along the tension anchor load axis of the tension anchor and loading an abutment surface of the retainer, through which abutment surface the tension anchor load axis or an axis parallel to the tension anchor load axis passes, against the transverse carrier.

Such a trailer coupling is described for example in DE 10 2013 018 771 A1. The concept of this trailer coupling provides for a single screw being used as the tension anchor for the fastening of the retainer on the transverse carrier which results in simple assembly. However, the components used, in particular the screw bolts, are quite deliberately very solid in order to be able to absorb the forces occurring during the driving operation. The material costs are significant.

Based on this, the object of the present invention is to provide an improved trailer coupling.

To achieve the object, in the case of a trailer coupling of the type mentioned at the outset, provision is made for the retainer to have at least one side support surface, which projects in front of the abutment surface adjacent to the tension anchor and lies against the transverse carrier such that the retainer is supported on the transverse carrier laterally adjacent to the tension anchor with respect to a force acting transversely to the tension anchor load axis of the tension anchor.

The force could also be designated as at least one force, i.e. such that the retainer is supported on the transverse carrier by the at least one side support surface laterally adjacent to the tension anchor with respect to at least one force acting transversely to the tension anchor load axis of the tension anchor.

A basic concept of the present invention is that the transverse carrier and the retainer are supported on one another laterally adjacent to the tension anchor such that forces acting on the retainer transversely to the tension anchor load axis of the tension anchor, for example support forces on the coupling arm or coupling element or pushing/pulling forces on the coupling element are transferred via the at least one side support surface to the transverse carrier. The tension anchor is as a result exclusively or at least substantially exclusively loaded with force in the direction of its tension anchor load axis or load axis; thus it only has to absorb pulling force, while forces acting transversely to its tension anchor load axis are at least partially absorbed by the at least one lateral side support surface of the retainer.

The force, by means of which the at least one side support surface supports the retainer and the transverse carrier on one another, can comprise one or a plurality of forces and/or have one or a plurality of force components, for example a force component running in the Y direction or vehicle transverse direction and/or a force component running in the Z direction or parallel to the vehicle vertical axis.

The at least one side support surface can for example support the retainer with respect to the transverse carrier in relation to a torque which runs around the tension anchor load axis. The support of the retainer by means of the side support surface with respect to the transverse carrier can, however, also be a rotational support or a support with respect to a torque which occurs around a rotational axis between the retainer and transverse carrier, said rotational axis being at an angle, in particular at right angles to the tension anchor load axis, in particular it intersects the tension anchor load axis in the region of the tension anchor. If the tension anchor load axis runs for example in the driving direction or X direction, the at least one side surface can support a torque with respect to the X direction and/or a torque with respect to a Y direction or vehicle transverse direction and/or a torque with respect to a Z direction or a direction parallel to the vehicle vertical axis.

It is preferred when the abutment surface and the at least one side support surface are at right angles to one another. The at least one side support surface thus extends preferably parallel to the tension anchor load axis of the tension anchor.

Moreover, the at least one side support surface can be a round side support surface and/or a side support surface which is not at right angles to the abutment surface or can comprise such a side support surface. For example, the at least one side support surface can be at an oblique angle to the abutment surface roughly like the side limb of a V-shape configuration.

The force, with respect to which the retainer is supported on the transverse carrier by means of the at least one side support surface, expediently runs at right angles or at an angle of roughly 90°, i.e. for example 80° to 100°, preferably 85° to 95°, to the tension anchor load axis of the tension anchor. In particular, the support force provided by the side support surface preferably runs roughly vertically in the position of use of the trailer coupling.

The at least one side support surface is for example provided on a support limb projecting in front of a base body of the retainer.

The at least one side support surface can, however, also be configured as a depression on a base body of the retainer. The abutment surface is expediently provided on the bottom of the depression.

An expedient concept provides for the at least one side support surface and the abutment surface continually merging into one another. Moreover, it is advantageous when there is no edge provided between the side support surface and the abutment surface.

For example, the abutment surface and the at least one side support surface can form or have a curvature contour. The curvature contour can for example be circular, elliptical or the like.

The at least one side support surface and the abutment surface can also be sections of an arched overall support surface or an overall support surface comprising an arched cross-section.

It is preferably provided that a receiving contour, for example round, and adapted to an edge region of the transverse carrier is provided between the abutment surface and the at least one side support surface.

Moreover, it is advantageous when the transverse carrier lies extensively and/or in a positive-locking manner against the at least one side support surface and the abutment surface and a receiving contour extending between the side support surface and the abutment surface.

One concept can provide for the at least one side support surface and the abutment surface forming an L-shaped configuration.

Moreover, it is possible for the side support surface and the abutment surface to form the only support surfaces by means of which the retainer is supported on the transverse carrier.

Moreover, it is advantageous for the retainer to be supported by means of the abutment surface and the only side support surface on the transverse carrier. This side support surface is expediently supported on an underside of the transverse carrier or on a surface of the transverse carrier facing a road surface.

The abutment surface is expediently vertically oriented in the position of use.

The at least one side support surface advantageously runs horizontally in the position of use.

Moreover, it is possible that no further side support surface of the retainer lies opposite the side support surface.

However, it is also possible that the abutment surface, so to speak, forms a bottom of a clamp-like receiving portion, in the case of which two side support surfaces project in front of the abutment surface, which are opposite one another and between which the transverse carrier is received.

It is preferably provided that the at least one side support surface comprises a first side support surface and a second side support surface which are opposite one another such that the transverse carrier is received between the first and second side support surface, A preferred concept provides for a U-shaped configuration, that is to say that the abutment surface is provided on the bottom and the opposing side support surfaces are provided on side limbs of the receiving portion.

The opposing side support surfaces are for example arranged in a U-shape or V-shape. A receiving portion for the transverse carrier with the side support surfaces thus has for example a U-shaped or a V-shaped cross-section.

Moreover, it is advantageous for the at least one side support surface to be supported on an, in position of use, upper or lower surface of the transverse carrier. The side support surface is thus supported for example on a surface of the transverse carrier, which is facing the or a road surface or is facing away from the surface. If two side support surfaces are present, they can of course be supported on an upper and lower surface of the transverse carrier or a surface of the transverse carrier facing away from the road surface and a surface of the transverse carrier facing the road surface.

A preferred concept provides for the at least one side support surface being a side support surface which is arranged on a support projection which engages into a receiving portion on the transverse carrier. The receiving portion can for example be a depression or a recess. The depression is for example provided on an edge region of the transverse carrier.

It is preferred when the retainer has at least two support projections between which the transverse carrier is arranged.

It is also possible for the receiving portion, in which the support projection engages, to be a through-opening or a hole on the transverse carrier. In particular, the through-opening is penetrated by the tension anchor.

The support projection or the at least one support projection is expediently arranged adjacent to the abutment surface or on the abutment surface. For example, the support projection projects in front of the abutment surface. It is possible that the support projection is arranged for example transversely centrally or longitudinally centrally or both on the abutment surface.

Moreover, it is advantageous when the support projection has a screw receiving portion for screwing in the tension anchor. Consequently, the tension anchor can thus be screwed into the support projection. It is also possible for the support projection to have a through-opening for the tension anchor. For example, the tension anchor can be connectable or be connected to the retainer penetrating through the through-opening of the support projection. The tension anchor can for example be a rod-shaped body which protrudes from the retainer and penetrates the support projection.

It is preferred when a support element is arranged between the retainer and the transverse carrier which has through-openings for the tension anchor, in particular a plurality of through-openings. For example, the support element can be plate-shaped. For example, two or further through-openings for tension anchors can be provided on the support element, with these tension anchor through-openings being expediently arranged in a row direction adjacent to one another. The row direction runs along or parallel to a longitudinal direction of the transverse carrier.

A preferred concept provides for example that the support element has through-openings for exactly or at least two tension anchors.

Moreover, it is advantageous when at least one support projection is present on the support element, which enters into a receiving portion or through-opening of the transverse carrier. The support element can thus for example provide one or a plurality of side support surfaces for support on the transverse carrier.

The support element itself is in turn advantageously supported on the retainer, at least on the abutment surface of the retainer. It is possible that the support element provides one or a plurality of side support surfaces, the retainer itself, however, does not support the transverse carrier directly laterally adjacent to the abutment surface.

The aforementioned measure is in particular readily implementable when the following advantageous configuration is carried out:

The support element is expediently supported on the abutment surface and the at least one side support surface of the retainer. However, it is also possible that the support element has an outer contour adapted to an inner contour of the retainer defined for example by the abutment surface and the at least one side support surface of the retainer and the outer contour of the support element is supported on the inner contour of the retainer. The inner contour can, however, also be provided in a different manner, that is to say that for example the support element is retained on the retainer in a positive-locking manner, for its part, it in turn provides the abutment surface and the at least one side support surface for the transverse carrier.

It is possible that the at least one side support surface is provided for supporting an outer side of the transverse carrier. It is also possible, in particular also in combination with the aforementioned measure that the at least one side support surface is provided for support on an inner contour, in particular a through-opening or receiving portion, of the transverse carrier. At this point, it should be noted that the combination of the aforementioned side support surfaces is in particular possible because a plurality of side support surfaces can be provided. Thus, for example one side support surface can enter into a through-opening or receiving portion, while another side support surface supports the transverse carrier on the outer side.

The tension anchor load axis is for example at right angles to the abutment surface.

The tension anchor, for example a tension anchor projection, can be integral with the retainer. The tension anchor or a load element of the tension anchor can for example project in front of the retainer in the direction of the transverse carrier. The retaining element can have a screw opening or through-opening for the tension anchor.

It is advantageously provided that the tension anchor assembly has a support element with a support surface and a support projection projecting in front of the support surface in the direction of the tension anchor load axis, said support projection penetrating into the through-opening of the side wall, with the support surface of the support element being supported with at least one force component in the direction of the load axis on the side wall of the transverse carrier adjacent to the through-opening and the support projection with at least one force component transversely to the load axis in the through-opening.

The force component can for example comprise or be a force component at right angles to the load axis or at an oblique angle to the load axis. The force component can for example be understood as a support force component.

A preferred concept provides that the support surface is located opposite the abutment surface of the retainer such that the side wall of the transverse carrier is clamped in the manner of a sandwich between the support surface and the abutment surface. In this case, the embodiment is also possible whereby a further layer, in particular a further support element is present between the side wall of the transverse carrier and the abutment surface. For example, this further support element can be configured as a plate or have a plate.

The support element is expediently a part separate from a tension anchor, for example a screw bolt, a rivet or the like. Moreover, it is advantageous when the support element is a part separate from the retainer. Therefore, the support element can be used, when required. The manufacture is simple. The support element can form a constituent part of an assembly set.

The transverse carrier is expediently configured as a whole or at least in sections as a profile part.

The support element can, for example, be arranged in an interior of the profile part. However, the support element can also lie against the transverse carrier on the outer side, in particular in the configuration as a part separate from the retainer. Consequently, the support element is arranged in this configuration outside of the profile part, apart from the at least one support projection, which enters into the through-opening of the profile part.

The support projection can for example have a receiving portion or through-opening into which the tension anchor penetrates or which the tension anchor penetrates. However, it is also possible that a fastening section protrudes from the support projection, which is for example located opposite a side wall opposing the side wall explained up to now. A screw means, in particular a nut can be screwed on this fastening section for example from the outside.

It is preferred when the support element is plate-shaped. The support element can thus for example comprise a support plate.

Moreover, it is advantageous when the support element is identical in terms of its contour to the side wall of the transverse carrier. Thus, for example, in the case of a round side wall of the transverse carrier, a round contour can be provided on the support element. For example, a recess-like round plate can essentially form the support element. However, it is also possible that for example the end face of the sleeve or support sleeve explained later has a contour, which fits the inner contour or outer contour of the transverse carrier.

A preferred concept provides that the support element is supported extensively on the transverse carrier. For example, the support element is supported with a base surface on the transverse carrier, in particular in the configuration as a support plate.

The support element may only have a single support projection, for example in a configuration as a support sleeve. However, the embodiment is also preferred in which the support element has two or further support projections. In particular, the support element can be configured in the manner of a support plate on which a plurality, for example at least two support projections are present to penetrate into corresponding through-openings or receiving portions on the transverse carrier.

The support element expediently has a head which is received in a second through-opening of a second side wall, which is located opposite the side wall of the transverse carrier which receives the support projection and therefore forms a first side wall.

It should be mentioned at this point that the profile part can have a closed profile or a laterally open profile, at least in sections. Thus, the profile part can for example be U-shaped in its cross-section. The profile part can, however, also be a closed profile, for example a profile with a rectangular or round or oval cross-section. A profile part U-shaped in its cross-section or profile part for example has first and second side walls opposing one another in the shape of the side limbs.

The profile part of the transverse carrier can extend uniformly over the entire length of the transverse carrier, i.e. for example the transverse carrier is round and/or closed over its entire length in its cross-section. However, it is also possible that the transverse carrier has different cross-sections or profile contours over its length. Thus, the transverse carrier can for example have a closed profile on a middle section, for example a round profile, while it is for example L-shaped or U-shaped in its cross-section at its longitudinal ends. The transverse carrier can be made of a single blank, thus, so to speak, integral, for example by a deformation, extrusion or the like. However, it is also possible that the transverse carrier has sections connected to one another, for example profiles of different type and/or geometry, which are welded, adhered together or connected to one another in a different manner.

The transverse carrier is for example configured as a whole or partially as a hollow profile.

The head can be free in the through-opening of the second side wall. It is preferred when the head is supported on at least one inner contour of the second through-opening transversely to the load axis. For example, the head can have a round outer contour and the second through-opening a round inner contour such that the head is received in a positive-locking manner in the through-opening. The round outer contours and inner contours enable rotatability of the head such that the head is for example rotatable in the case of the configuration of the support element as a screw. However, it is also possible that the outer contour of the head and the inner contour of the second through-opening form or have a rotation lock, for example have a polygonal cross-section. Therefore, the head can be received in a rotationally-locked manner in the second through-opening.

The head can for example be the head of a screw, but also the head of a support element explained later, configured as a support sleeve.

The head can project laterally in front of the second through-opening or the through-opening of the second side wall. In this case, it is possible that the head for example loads the second side wall in the direction of the first side wall or of the retainer. Consequently, the head can thus, so to speak, load the second side wall in the direction of the retainer.

In the case of this measure, it can be provided that the cross-section of the profile part or transverse carrier is unimpaired or undamaged. However, a certain deformation is also possible, i.e. that the head somewhat deforms the transverse carrier in the direction of the retainer, which enables particularly fixed retention.

A preferred embodiment of the invention for example provides that a side wall connecting the first and the second side wall, for example side walls opposite one another, is deformed by the tension anchor, for example its head, by a nut, which is screwed onto the tension anchor or the like, transversely to the load axis. For example, a recess or indentation is formed by this deformation on the side wall. The side wall is for example an upper or lower side wall of the transverse carrier (in the position of use or in the state assembled on the motor vehicle).

The support surface is in particular provided on a screw bolt, which projects with a screw section to the retainer, for example is screwed into a screw receiving portion of the retainer or penetrates a through-opening of the retainer and is secured by a nut with its section protruding in front of the through-opening. The support surface protrudes laterally in front of the screw section in the manner of a step. Consequently, a type of stepped bolt is formed.

The support projection can, for example, be formed by the screw section or a bolt section provided between the screw section and the support surface. A screw thread is expediently not provided on the bolt section.

The support surface can also be provided on a support sleeve, which has a through-opening for the tension anchor and is penetrated by the tension anchor. The support sleeve is expediently arranged in the interior or an interior of the profile part. The tension anchor is for example formed by a screw bolt, which is inserted through the support sleeve and is in particular screwed with the retainer. However, a nut can also be provided on the retainer in order to tighten the tension anchor.

The support sleeve has a head section, which projects laterally in front of the second through-opening. A head of the tension anchor, for example a screw head, a nut or the like is expediently received in the head section. The head receiving portion can also project laterally in front of the second through-opening. The head section can for example serve to load the second side wall in the direction of the first side wall. If the head of the tension anchor is also received in the head section, it preferably also projects laterally in front of the through-opening. Therefore, the head of the tension anchor can act directly on the second side wall.

It is also possible that the support sleeve does not project in front an outer side of the second side wall facing away from the first side wall, for example when it is set back with the side wall or behind the outer side. For example, the support sleeve is, so to speak, flush in relation to the outer side. If the head of the tension anchor is screwed in the direction of the retainer or a nut is screwed on the tension anchor, it can for example load the second side wall in the direction of the retainer, without the support sleeve, so to speak, being in the way.

It is preferred when at least one tension anchor or all tension anchors of the tension anchor assembly do not project in front of a side wall, also designated above as second side wall, of the transverse carrier which is opposite the side wall receiving the support projection. Therefore, no screw heads are, so to speak, in the way. However, it is possible that the tension anchor or a sleeve, in which the tension anchor is received, in particular the support sleeve, in the so to speak second side wall, is supported transversely to the load axis. This is even clearer in an exemplary embodiment of the drawing.

A receiving portion for the support projection is expediently provided on the retainer, into which the support projection penetrates. The support projection is expediently supported in the receiving portion transversely to the load axis, preferably not only over a partial circumference, but rather over its entire outer circumference. Therefore, the support projection has support on the retainer transversely to the load axis. The tension anchor is still loaded substantially only along its longitudinal axis or load axis by forces. It is preferred when the support projection, on the one hand, in the receiving portion of the retainer and, on the other hand, in the through-opening of the transverse carrier, is supported transversely to the load axis, in particular in a plurality of directions transversely to the load axis or all directions transversely to the load axis. The support projection then absorbs transverse forces transversely to the load axis, which therefore cannot load or can only insignificantly load the tension anchor.

The support projection thus for example forms a longitudinal guide for the tension anchor.

The tension anchor assembly preferably comprises a plurality of tension anchors, in particular a first tension anchor and a second tension anchor. The tension anchors are expediently arranged adjacent to one another along a longitudinal axis of the transverse carrier.

The tension anchors extend for example exactly horizontally or substantially horizontally in the state of the trailer coupling assembled on the motor vehicle.

The application of the invention is possible in a variety of manners. The retainer can for example have a plug-in receiving portion for affixing or inserting a plug-in projection or plug-in section of the coupling element such that it is configured for example detachably from the retainer. In order to lock the coupling element on the retainer, a locking device is expediently provided e.g. with a bolt and positive-locking elements or the like.

Moreover, it is preferred when the coupling element is mounted pivotably and/or displaceably on the retainer by means of a bearing, in particular between a position of use suitable for the fastening of the load carrier or trailer and a position of non-use in particular concealed behind a bumper of the motor vehicle.

However, it is also possible that the coupling element is connected to the retainer fixedly, in particular integrally, for example screwed, welded or manufactured as one part with the retainer, in particular as a cast part or forged part.

Exemplary embodiments of the invention are explained below on the basis of the drawing, in which:

FIG. 1 shows a perspective oblique view of the trailer coupling having a carrier assembly with a retainer and a coupling arm, FIG. 2 shows an exploded representation of the trailer coupling according to FIG. 1, FIG. 3 shows the components of the trailer coupling according to FIG. 2, cut roughly along a cutline A-A in FIG. 1, FIG. 4 shows a cut through the trailer coupling according to FIG. 1, roughly along a cutline A-A, FIG. 5 shows a further trailer coupling, which in FIG. 6 is represented in an exploded representation, FIG. 7 shows the components of the trailer coupling according to FIG. 6, cut roughly along a cutline B-B in FIG. 5, FIG. 8 shows a cut through the trailer coupling according to FIG. 5, roughly along a cutline B-B, FIG. 9 shows a perspective oblique view of a trailer coupling with a retainer comprising two side support surfaces, FIG. 10 shows the trailer coupling according to FIG. 9 in an exploded representation, FIG. 11 shows a sectional representation of the trailer coupling from FIG. 9, cut roughly along a cutline F-F, FIG. 12 shows the trailer coupling according to FIGS. 9-11 from obliquely behind, FIG. 13 shows an exploded representation of a trailer coupling with a retainer modified with respect to FIG. 1, which has only a single side support surface, FIG. 14 shows a sectional representation through the carrier assembly according to FIG. 13 in the assembled state, roughly along a cutline H-H in FIG. 13, FIG. 15 shows an exploded representation of a further trailer coupling with a retainer, which has a lateral side support surface and a support projection on a support element, FIG. 16 shows the trailer coupling according to FIG. 15 in the assembled state, FIG. 17 shows a cross-section through the trailer coupling according to FIG. 16 roughly along a cutline K-K, FIG. 18 shows an exploded representation of a further trailer coupling with a retainer, with a support projection being provided on the retainer, FIG. 19 shows the trailer coupling according to FIG. 18 in the assembled state, FIG. 20 shows the trailer coupling according to FIGS. 18 and 19 in perspective obliquely from behind, FIG. 21 shows a cut through the trailer coupling according to FIG. 19, roughly along a cutline I-I, FIG. 22 shows an exploded representation of a further trailer coupling obliquely from above, which in FIG. 23 is represented assembled, FIG. 24 shows a cross-section through the trailer coupling according to FIG. 23, roughly along a cutline L-L and FIG. 25 shows the trailer coupling according to FIGS. 22-24 in an exploded representation obliquely from behind.

A trailer coupling 10 according to FIG. 1 comprises a transverse carrier 11 of a carrier arrangement 12. The transverse carrier 11 is for example provided on its longitudinal end regions 13 with side carriers 14 schematically represented in FIG. 9, which are fastened, for example screwed and/or welded and/or adhered to a body 91 of a motor vehicle 90. The transverse carrier 12 extends in the vehicle transverse direction of the motor vehicle 90 for example behind a bumper 92 such that it is not visible during use. In principle, it would be possible to connect the transverse carrier 12 directly to the body 91, for example by the longitudinal ends 13 being screwed, welded or otherwise connected in a different manner to the body 90.

The transverse carrier 12 has a rectangular cross-section with upper and lower side walls 15, 16 in the state of the carrier assembly 11 assembled on the motor vehicle 90, which are connected to one another by a front and rear side wall 17, 18. Curvature sections 19 are provided between the side walls 15-18 such that the profile of the transverse carrier 12 does not have sharp edges (which would, however, also be possible), but rather round edges.

The transverse carrier 12 is formed as a profile part 20. The side walls 15-18 delimit a cavity 21.

A retainer 40 is arranged on a middle section 22 of the transverse carrier 12 on which a coupling arm 42 is retained as a coupling element 41. A coupling piece 43 is located on a free end region of the coupling arm 42 or the coupling element 41 to couple a load carrier or, as represented in FIG. 9, a trailer 95. The trailer 95 has, for example, on its drawbar a so-called tension ball coupling 96, which is detachably connectable to the coupling piece 43, in the present case a coupling ball 44 in a manner known per se. In a similar manner, a load carrier 195 could be fastened on the coupling piece 43, for example by means of a clamp coupling 196.

The coupling element 41 is arranged on a retaining section 45 of the retainer 40. A fixed arrangement would be possible here, but also for example an insert connection with insert projection and insert receiving portion. For example, an insert projection 149 for insertion into an insert receiving portion 148 is provided on the retaining section 45 on a coupling element 141 provided instead of the coupling element 41. The associated locking means are not represented in the drawing. The coupling arm 141 could also be integral with the retaining section 45 or be connected thereto for example by a screw connection or weld connection.

In the case of the exemplary embodiments in the drawing, the coupling element 41 is mounted around a pivot axis W so as to be pivotable between a position of use G and a position of non-use N in which it is not suitable for the fastening of a trailer or a load carrier. For example, the coupling arm 42 is concealed in the position of non-use N behind the bumper 92, while it projects in the position of use G in front of the bumper with the coupling piece 43.

The retaining section 45 comprises a retaining arm 46, which protrudes from a base body 47 of the retainer 40. For example, a bearing receiving portion 48 is provided on the retaining arm 46 into which for example a bearing bolt is fixedly or rotatably retained which engages into a pivot section 49 of the coupling element 41. Only positive locking receiving portions 49A are visible in the drawing from a locking assembly to lock the coupling element 41 in relation to the retainer 40 in the position of use G and the position of non-use N.

It can be envisaged that the forces occurring during the use of the trailer coupling 10 are quite large, i.e. large support forces, pulling forces and pushing forces of a load carrier or trailer act on the retaining section 45 of the retainer 40, which can, however, be transferred by the fastening measures, explained below, of the retainer 40 on the transverse carrier 12 effectively from the coupling element 41 to the carrier assembly 11 and therefore ultimately to the body 91 of the motor vehicle 90. The forces occurring during the driving operation are optimally absorbed by the trailer coupling 10 and transferred to the motor vehicle 90 or its body 91.

The fastening concepts of retainers on a transverse carrier explained below relate to some extent to the same or similar components in the case of different exemplary embodiments such that in this respect the same or similar reference numerals are selected. If components differ from one another, reference numerals are largely selected which differ from one another simply by "100".

The retainer 40 is supported on the transverse carrier 12 on an abutment surface 50. A side support surface 51 projects in front of the abutment surface 50. The transverse carrier 12 with its lower side wall 16 is supported on the side support surface 51, on the abutment surface 50 with its front side wall 17. The abutment surface 50 and the side support surface 51 are thus arranged at the same angle to one another, as the outer sides of the side walls 17, 18.

Consequently, the transverse carrier 12 is thus supported in a receiving portion 53 of the retainer 40 in a positive-locking manner and indeed not only in one direction, but in directions angled in relation to one another. The side support surface 51 is for example provided on a support limb 54 which projects at an angle in front of a screw limb 55. The support limb 54 and the fastening limb 55 are formed on the base body 47.

The fastening limb 55 serves for the fastening of the transverse carrier 12 by means of a tension anchor assembly 60. The tension anchor assembly 60 comprises tension anchors 61, which penetrate through-openings 24, 23 on the side walls 18, 17 and are screwed into screw receiving portions 56 on the retainer 40. The screw receiving portions 56 are located on the abutment surface 50. The tension anchors 61 can thus be screwed along their tension anchor load axis S in the direction of the abutment surface 50, with said tension anchors tightening the transverse carrier 12 with the receiving portion 50, namely in the direction of the abutment surface 50.

The tension anchors 61 are received in support sleeves 70 forming support elements 80, said support sleeves have through-openings 71 for the tension anchors 61. The tension anchors 61 have heads 62, which are received in head receiving portions 72. The head receiving portions 72 are provided on head sections 73 of the support sleeves 70, which project laterally in front of the through-openings 54 on the side wall 18. Consequently, the head sections 73 are thus supported with support surfaces 74 on the side wall 18 such that ultimately the heads 62 of the tension anchors 61 and the head sections 73 of the support sleeves 70 load the side wall 18 in the direction of the abutment surface 50 and consequently in the direction of the retainer 40.

Therefore, the transverse carrier 12 is in any case loaded by means of the support sleeves 70 and the tension anchors 61 in the direction of the retainer 40. In this case, there is now the danger per se that for example the side wall 18 is deformed in the direction of the side wall 17 such that the transverse carrier 12 or its profile is less capable of bearing a load. In contrast, the support sleeve 70 provides resistance. In addition, the support sleeve 70 ensures that the tension anchor 61 also loads the side wall 17 in the direction of the abutment surface 50. To this end, a step is provided between a sleeve section 76 of the support sleeve 70 and a support projection 77 of the support sleeve 70.

The support projection 77 projects in front of a step 75. The side support surface 74 or step 75 is supported on the side wall 17.

The support projection 77 penetrates the receiving portion 23 and a through-opening 86 of a support element 85 and then penetrates into a receiving portion 57 of the retainer 50. The support projection 77 is supported on its outer circumference both on the circumferential side in the through-opening 23 and in the receiving portion 57. Moreover, the inner cross-section of the through-opening 86 of the support element 85 is also adapted to the outer contour of the support projection 77, thus it is received in a positive-locking manner in all three mentioned components 57, 86, 23. Therefore, the support projection 77 can effectively absorb forces or transverse forces acting transversely to the load axis S without them loading the tension anchor 61 on its screw section 63. The screw section 63 is provided on a free end region of the tension anchor 61, which in the present case is configured as a screw bolt. The screw section 63 and the head 62 are provided on the longitudinal end regions of a bolt section 64. The bolt section 64 is received in the sleeve section 76. The screw section 63 projects in front of the sleeve section 76 and is screwed into a screw section 58 of the screw receiving portion 56 of the retainer 40.

In the case of a trailer coupling 110, the retainer 40 is connected by means of a tension anchor assembly 160 to a transverse carrier 112 of a carrier assembly 111, which is essentially very similar to the transverse carrier 12, but undergoes a deformation at the middle section 22 owing to the tension anchor assembly 160, which will be described.

The tension anchor assembly 160 comprises tension anchors 161, for example screw bolts 166, which are configured as stepped bolts. The tension anchors 161 have heads 162, which are supported on the outer side of the side wall 18. Bolt sections 164 of the tension anchor 161 penetrate into the cavity 21 between the side walls 17, 18. In this case, a support surface 74 is supported on the head section or head 162 on the outer side of the side wall 18 and loads this side wall 17 facing in the direction of the retainer 40. As a result, the side walls 15, 16, which extend between the side walls 17 18, are deformed. A side wall section 115 and a side wall section 116 of the upper and lower side wall 15, 16 are formed, which forms a deformation 126 inwards in the direction of the cavity 21. As a result, the middle section 22 is also stiffened.

A support projection 177 projects in front of the bolt section 164 which is received in the already explained receiving portion 57 of the retainer 40. The support projection 177 penetrates the through-opening 23 on the side wall 17, the through-openings 86 of the support element 85 and ultimately penetrates into the receiving portion 77. Therefore, the support projection 77 can also absorb transverse forces Q occurring transversely to the load axis S.

A step 175 is provided between the support projection 177 and the bolt section 164. A support surface 178 is located on the step 175 which is supported on the inner side or inner surface of the side wall 17 (i.e. the surface facing the cavity 21) adjacent to the through-opening 23. As a result, the side wall 17 is tensioned or loaded in the direction of the abutment surface 50. The support element 80 located between the abutment surface 50 and the side wall 17 transfers the load force of the tension anchor 161, which acts on the transverse carrier 112, to the abutment surface 50.

The transverse carrier 112 rests on the side support surface 51 with the side wall section 116. Therefore, the retainer 40 is, on the one hand, supported by the support projection 77, on the other hand, by the surfaces of the side wall 16 and of the side support surface 51 acting on one another transversely to the load axis S.

The assembly is designed, unlike the trailer coupling 10, in this regard lighter than the tension anchor 161, at the same time forms a support element, i.e. no additional support sleeve 70 is to be assembled. Accordingly, the tension anchor 161 has preferably a larger, loadable cross-section to the load axis S. In particular, the support projection 177 has a larger cross-section than the screw section 163.

A retainer 240 of a trailer coupling 210 has, in part, identical or similar components as the retainer 40. The retainer 240 for example comprises a support limb 254 and fastening limb 255 which essentially resembles the support limb 54 and projects in front of an abutment surface 250, which is provided on the bottom of a receiving portion 253. The receiving portion 253 essentially corresponds to the receiving portion 53, but is not L-shaped, but rather U-shaped. A further support limb 259 projects namely from the bottom surface or base surface of the receiving portion 253 and is located opposite the support limb 254. The two support limbs 254, 259 have side support surfaces 251, 252 opposite one another, between which the transverse carrier 12 is received in a positive-locking manner. Therefore, transverse forces Q occurring transversely to the load axis S, with which tension anchors 261 of a tension anchor assembly 260 tighten the transverse carrier 12 and the retainer 240 together, can be absorbed by the side support surfaces 251, 252.

The tension anchors 261 comprise for example screw bolts, whose screw sections 263 are screwed into nuts 266 and screw receiving portion 256. The tension anchors 261 are supported with their heads 262 on the side wall 18 and penetrate the through-openings 24, 23 and 275 of the transverse carrier 12 and a through-opening 266 of a bottom wall of the receiving portion 253, with the nut 266 being supported on a rear side of this bottom wall. Therefore, the bottom wall of the receiving portion 253 and of the transverse carrier 12 are loaded between the nuts 266 and the head 262.

In this case, relatively large load forces can occur along the load axis S which could in principle lead to a deformation of the side wall 18. A support sleeve 230 is provided as a counter measure which is supported, on the end face on the one hand, on the side wall 17, however, on the other end face, provides an abutment surface 233 for the head 262. The abutment surface 233 does not project in front of the outer side of the side wall 18, thus is flush with the side wall 18 or is set back. Therefore, the head 262 cannot, or can only to a small extent, deform the side wall 18 in the direction of the side wall 18 of the transverse carrier 12 such that its carrier structure or cross-section contour is maintained and undamaged.

In the case of a trailer coupling 310, a retainer 340, which is constructed similar to the retainer 40 and pivotably mounts a coupling arm 42 or a coupling element 41, is connected with the already known transverse carrier 12, namely by means of the already explained tension anchor assembly 260. However, the retainer 340, unlike the retainer 240, has only one support limb 354, which corresponds to the support limb 54, while a support limb corresponding to the support limb 259 is not present. Moreover, unlike the fastening concept of the trailer coupling 210, the already explained support element 85, i.e. a plate with through-openings 86 is provided, which is supported on the abutment surface 350 (corresponding to the abutment surfaces 50, 250) and is arranged in the manner of a sandwich between the side wall 17 and this abutment surface 350. Moreover, it is advantageously provided that below the head 262 or between the head 262 and the side wall 18, a further support element or a washer 367 is provided in order to introduce the force acting from the head 262 on the side wall 18 in the direction of the load axis S extensively laterally adjacent to the through-opening 24 on the transverse carrier 12.

Moreover, it should be made clear that a non-horizontal tensioning of transverse carriers and retainers is also possible, e.g. a vertical tensioning, which is provided by means of a tension anchor 361. The tension anchor 361 loads the transverse carrier 12 for example against the side support surface 351, which in this case, so to speak, constitutes an abutment surface in relation to the load axis of the tension anchor 361. The function of the abutment surface 50 is, in this case, also another, namely that of a side support surface. It is readily discernible that of course a plurality of tension anchors acting in different directions or tension directions are possible when fastening a retainer on the transverse carrier of a trailer coupling. For example, the tension anchors 261 and also the tension anchor 361 or a plurality of tension anchors 361 could be provided for fastening the retainer 340 on the transverse carrier 12.

In the case of a trailer coupling 410, a retainer 440 is connected to a transverse carrier 412 of a carrier assembly 411 by means of a tension anchor assembly 460.

The transverse carrier 412 has a round, in particular a circular round cross-section, is thus not polygonal, unlike the transverse carriers 12. A side wall of the transverse carrier 12 has for example upper, lower and front and rear side wall sections (in the position of use or in the state of the carrier assembly 412 assembled on the motor vehicle 90), with only one side wall 417, which is fastened to the retainer 440 and supported there directly, being explained below in detail.

The retainer 440 has the known base body 47 from which a retaining arm 76 for retaining and in particular pivotably mounting the already explained coupling element 41 is provided. A receiving portion 453 is provided for the transverse carrier 412 on the base body 47. The receiving portion 453 has an abutment surface 450 and a side support surface 451 which projects in front of the abutment surface 450 in the direction of the load axes S of the tension anchors 461 of the tension anchor assembly 460.

Screw receiving portions 456 are provided on the abutment surface 450 for the tension anchors 461 which are screwed into the screw receiving portions 456 with screw sections 463.

The screw bolts or tension anchors 461 penetrate through-openings 24, 23 of the transverse carrier 12 and are screwed into the screw receiving portions 456, whereby they tighten the retainer 440 along load axes S with the transverse carrier 412.

In addition, the tension anchors 461 penetrate support sleeves 430, which are arranged in the interior or cavity 421 of the transverse carrier 412. The support sleeves 430 serve in particular for the head 462 not to deform a side wall section 418 of the transverse carrier 412 or profile part 420 opposite the side wall section 417 or the retainer 440 in the direction of the retainer 440 or only to a predetermined extent.

Moreover, the tension anchors 461 are supported transversely to the load axis S, namely by the side support surface 451, at least indirectly by the side support surface 461.

In the receiving portion 453 and therefore between the retainer 440 and the transverse carrier 412, a support element 480 in the shape of a support plate 470 is arranged. The support plate 470 has an inner contour 472, which is adapted to the outer contour of the transverse carrier 12. An outer contour 473 of the support element 480 is, in turn, adapted to an inner contour of the receiving portion 453, consequently thus to a contour, which is defined by the abutment surface 450 and the side support surface 451. Therefore, the support element 48 is received in the receiving portion 453 in a positive-locking manner.

The inner contour 472 further allows a positive-locking support of the transverse carrier 412 on the support element 480, namely along the load axis S, but also transversely thereto. For example, the side support surface 451 is, so to speak, advanced by the support element 480 in the direction of the transverse carrier 412 such that a lower side wall section 416 of the transverse carrier 412 is supported transversely to the load axis S on the support element 480 and ultimately on the side support surface 451. A support section 452 of the support element 480 opposite the side support surface 451 ensures that an upper side wall section 415 of the transverse carrier 12 is also supported on the support element 480 transversely to the load axis S.

However, the support element 480 still also fulfils a guiding and securing function for the screw bolt or tension anchor 461. The tension anchor 461 penetrates namely the through-opening 471 of the support element 480 and projects with its screw section 463 in front of the support element 480. The through-opening 471 is provided on a support projection 477, which penetrates into the receiving portion 423 of the transverse carrier 412 and therefore supports the tension anchor 461 transversely to the load axis S. Transverse forces acting transversely to the load axis S on the combination of retainer 440 and transverse carrier 412 are thus effectively absorbed by the support projection 477.

On an end face, i.e. facing away from the retainer 440 or away from the abutment surface 450, of the support projection 477, is supported a support sleeve 430, which is also penetrated by the screw bolt or tension anchor 461. The head 462 therefore loads the support sleeve 430 along the load axis S against the support surface 475 which contributes to the tensioning of the support element 480 with the receiving portion 453 or the retainer 440.

Fastening means for fastening the carrier assembly 411 on the motor vehicle 90 are provided on longitudinal end regions 413 of the transverse carrier 412 which is not represented in connection with the trailer coupling 410. For example, side carriers 414 or fastening limbs 414 are provided, which have plate-shaped carrier elements 426. Screw openings 428 are provided on the carrier elements 426 through which screws 427 or other similar screw means are provided for screwing the carrier assembly 411 to the motor vehicle 90. The carrier assembly 411 can for example be screwed with the screws 428 on a rear side body panel or longitudinal carrier of the body 91.

The support sleeves 430 are expediently set back in relation to the side wall section 418 such that the head 462 can deform the side wall section 418 to a small extent in the direction of the side wall section 417.

In the case of a trailer coupling 510, a retainer 540 is fastened on the already explained transverse carrier 412 or the carrier assembly 411. The retainer 540 comprises the retaining arm 46 and further components in order to retain, in particular to pivotably mount the coupling element 41 and in this respect resembles the already described retainers 40, 440, etc.

Moreover, the tension anchor assembly 460, which comprises tension anchors 461, is used through which the through-openings 24, 23 of the transverse carrier 412 are inserted and are screwed into screw receiving portions 556 of the retainer 540.

The retainer 540 comprises a receiving portion 553 for the transverse carrier 412. The receiving portion 553 comprises an abutment surface 550 against which the transverse carrier 12 is loaded along load axes S of the tension anchors 461. Transversely to the load axis S or at right angles to the abutment surface 450, a side support surface 551 is provided on a support limb 554 which projects in front of the abutment surface 450. The abutment surface 550 and the side support surface 551 form the receiving portion 553 such that the transverse carrier 412 and the retainer 540 are loaded longitudinally along the load axis S by the abutment surface 550, transversely thereto by the side support surface 451. The side support surface 551 preferably extends on both sides of the load axis S, i.e. in FIG. 21 for example also above the load axis S. The inner contour of the recess-like receiving portion 453 is adapted to the outer contour of the profile part 420 or the transverse carrier 412, i.e. is substantially round.

A support sleeve 430 is in each case provided in the interior or cavity 421 of the transverse carrier 412 which is, on the one hand, supported on the head 462 of the respective tension anchor 461, on the other hand, on a support projection 577.

The support projection 577 projects in front of the bottom or the abutment surface 550 of the receiving portion 553 and penetrates into the through-openings 23 of the profile part 420 or transverse carrier 412. The support projection 577 forms, so to speak, a support dome, which supports the transverse carrier 412 on the retainer 540 transversely to the load axis S. The side support surfaces 451 and the outer circumference of the support projection 577 thus ensure a transverse support of the profile or transverse carrier 12 transversely to the load axis S on the retainer 540.

Even in the case of a trailer coupling 610 with a retainer 640, a transverse support of the retainer 640 is provided transversely to the load axes S of a tension anchor assembly 660 by means of which the retainer 640 is fastened on the transverse carrier 612 of the carrier assembly 611.

The transverse carrier 612 has a rectangular cross-section, similar to the transverse carrier 12, thus upper and lower side walls 615, 616 and front and rear side walls 617, 618. The transverse carrier 12 has a profile part 620 or is formed as a result. At the longitudinal ends 613 of the transverse carrier 612, screw openings or through-openings 628 are for example provided for screwing with the body 91 of the motor vehicle 90.

The retainer 640 serves to retain a coupling element 641. The coupling element 641 is for example fixedly fastened to the retainer 640, with a pivot concept according to the previous exemplary embodiments also being possible. The coupling element 641 has a coupling arms 642, on whose free end region a coupling part 43, in particular a coupling ball is arranged. An arm section 649 of the coupling arm 642 has boreholes 643, through which fastening bolts not represented in the drawing, for example screws, are insertable. The arm section 649 is for example received in a receiving portion 648 of the retainer 640, through which side limb 645 is delimited. The receiving portion 648 is for example U-shaped and provided on a retaining arm 646 of the retainer 640. Through-openings or boreholes 644 are provided on the side limbs 640 which align with the through-openings or boreholes 643 such that corresponding fastening bolts, screws or the like are insertable through the through-openings 644, 643 to fasten the coupling element 641 on the retainer 640.

The retainer 640 has on a fastening limb 655, from which the retaining arm 646 protrudes, screw receiving portions 656, into which screw bolts or tension anchors 661 are screwable. The screw receiving portions 656 are provided on an abutment surface 650. The tension anchors 661 are inserted through the through-openings 624, 623 of the transverse carrier 612 and penetrate the through-openings 656. The screw bolts or tension anchors 661 project with screw sections 663 in front of a rear side of a wall 659, whose front side provides the abutment surface 650. Nuts 666 are screwed onto the screw sections 663, which are supported on the rear side of the wall 659. Therefore, the transverse carrier 612 and the bottom wall or wall 659 are thus tightened with one another by means of the tension anchors 661 and are located between the head 662 and the nut 666.

Support sleeves 630 are provided so that in the case of this tightening, the side wall 618 is not or not excessively loaded in the direction of the side wall 617 and is possibly deformed and/or a load force can be exerted by the head 662 along the load axis S on the side wall 617 in the direction of the abutment surface 650. The support sleeves 630 are supported on the end face, on the one hand, on the inner side of the side wall 617 facing the cavity 621 and, on the other hand, provide an end face support surface for the head 662 on which it is supported. The head 662 thus presses the support sleeve 630 in the direction of the side wall 617 or loads it in the direction of the load axis S against the side wall 17 such that it is loaded by the support sleeve 630 against the abutment surface 650.

A receiving portion 653 is formed in the region of the abutment surface 650 to support transverse forces transversely to the load axis S. Support projections 654 project in front of the abutment surface 650, whose sides facing one another provide side support surfaces 651 and 652. The side support surfaces 651, 652 are rectangular and are in any case at an angle to the abutment surface 650. A variant of the invention can now provide for the upper and lower side walls 615, 616 to lie against the side support surfaces 651, 652. However, in the case of the exemplary embodiment, receiving portions 678 are provided on an edge region 619, which is shaped as a curvature section, between the side walls 15, 17 and 17, 18. The projections or support projections 654 engage into the receiving portions 678.

The heads 662 can be supported by support elements 85 or washers for better force transfer or transfer of forces to the side wall 618. The support elements 85 are located in the manner of a sandwich between the heads 62 and the side wall 618.

The invention claimed is:

1. A trailer coupling for a motor vehicle comprising: a carrier assembly comprising a transverse carrier for arranging on the rear of a motor vehicle and a retainer retained on the transverse carrier for retaining a coupling element, of the trailer coupling, wherein the coupling element is provided for fastening a trailer or a load carrier, wherein the retainer is connected to the transverse carrier by a tension anchor of a tension anchor assembly, wherein the tension anchor penetrates the transverse carrier along a tension anchor load axis of the tension anchor and loads an abutment surface of the retainer, through which abutment surface the tension anchor load axis or an axis parallel to the tension anchor load axis passes, against the transverse carrier, wherein the retainer has at least one side support surface which projects in front of the abutment surface adjacent to the tension anchor and lies against the transverse carrier such that the retainer is supported on the transverse carrier laterally adjacent to the tension carrier with respect to a force acting transversely to the tension anchor load axis of the tension anchor, wherein the tension anchor comprises a head and the head supports the tension anchor on the transverse carrier.

2. The trailer coupling according to claim 1, wherein the at least one side support surface is at right angles to the abutment surface.

3. The trailer coupling according to claim 1, wherein the at least one side support surface comprises a side support surface at right angles to the abutment surface.

4. The trailer coupling according to claim 1, wherein the at least one side support surface is a round side support surface.

5. The trailer coupling according to claim 1, wherein the at least one side support surface and the abutment surface merge into one another continually or without an edge running between the side support surface and the abutment surface.

6. The trailer coupling according to claim 1, wherein the at least one side support surface and the abutment surface form a circular curvature contour.

7. The trailer coupling according to claim 1, wherein the at least one side support surface and the abutment surface are formed by sections of an overall support surface having an arched cross-section.

8. The trailer coupling according claim 1, wherein a round receiving contour adapted to an edge region of the transverse carrier is arranged between the abutment surface and the-at least one side support surface.

9. The trailer coupling according to claim 8, wherein the transverse carrier lies against the receiving contour in an extensive or positive-locking manner.

10. The trailer coupling according to claim 1, wherein the at least one side support surface and the abutment surface form an L-shaped cross-section of the retainer or are arranged in an L-shape.

11. The trailer coupling according to claim 1, wherein the retainer is supported exclusively by the at least one side support surface and the abutment surface on the transverse carrier.

12. The trailer coupling according to claim 1, wherein the at least one side support surface is supported on, in the position of use, a lower surface of the transverse carrier and/or surface of the transverse carrier facing a road surface and/or in that the at least one side support surface is supported on, in the position of use, an upper surface of the transverse carrier or surface of the transverse carrier facing away from a road surface.

13. The trailer coupling according claim 1, wherein no further side support surface of the retainer is located opposite the at least one side support surface.

14. The trailer coupling according to claim 1, wherein the at least one side support surface comprises a first side support surface and a second side support surface which lie opposite one another such that the transverse carrier is received between the first and second side support surfaces.

15. The trailer coupling according to claim 14, wherein the first side support surface and the second side support surface are arranged in a U-shape or V-shape.

16. The trailer coupling according to claim 1, wherein the at least one side support surface is or comprises a side support surface which is arranged on a support projection which engages into a receiving portion on the transverse carrier.

17. The trailer coupling according to claim 16, wherein the support projection is arranged adjacent to the abutment surface or on the abutment surface.

18. The trailer coupling according to claim 16, wherein the support projection has a screw receiving portion for screwing the tension anchor or a through-opening for the tension anchor.

19. The trailer coupling according to claim 1, wherein a support element is arranged between the retainer and the transverse carrier which has at least one through-opening for the tension anchor assembly.

20. The trailer coupling according to claim 19, wherein the support element has through-openings for at least two tension anchors and/or has at least one support projection, which penetrates into a receiving portion or through-opening of the transverse carrier.

21. The trailer coupling according to claim 19, wherein the support element is supported on the abutment surface and the at least one side support surface of the retainer and/or in that the support element has an outer contour adapted to an inner contour of the retainer defined by the abutment surface and the at least one side support surface of the retainer, wherein the outer contour is supported on the inner contour.

22. The trailer coupling according to claim 1, wherein the at least one side support surface is provided on a support limb projecting in front of a base body of the retainer and/or the retainer has a depression, wherein the abutment surface is expediently provided on its bottom.

23. The trailer coupling according to claim 1, wherein the at least one side support surface is provided for support on an outer side of the transverse carrier or for support on an inner contour of the transverse carrier.

24. The trailer coupling according to claim 1, wherein the tension anchor assembly has a first tension anchor and a second tension anchor which are arranged adjacent to one another along a longitudinal axis of the transverse carrier.

25. The trailer coupling according to claim 1, wherein a force, in relation to which the retainer is supported on the transverse carrier by the at least one side support surface, runs at right angles or roughly at right angles to the tension anchor load axis of the tension anchor and/or is or comprises a force which, in the position of use, is fully or substantially vertical.

26. The trailer coupling according to claim 1, wherein the retainer is a plug-in receiving portion for plugging in the coupling element and/or a bearing for pivotably and/or displaceably mounting the coupling element between a position of use suitable for fastening the load carrier or trailer and a position of non-use concealed behind a bumper of the motor vehicle and/or the coupling element is fixedly arranged on the retainer.

27. The trailer coupling according to claim 1, wherein the tension anchor penetrates the transverse carrier along the tension anchor load axis of the tension anchor and loads the abutment surface of the retainer, through which abutment surface the tension anchor load axis or an axis parallel to the tension anchor load axis passes, against a side wall of the transverse carrier, which has a through-opening for the tension anchor, in that the tension anchor assembly has a support element with a side support surface designed in particular as a step and a support projection projecting in front of the side support surface in the direction of the tension anchor load axis, said support projection penetrating into the through-opening of the side wall, wherein the side support surface of the support element is supported with at least one force component in the direction of the load axis on the side wall of the transverse carrier adjacent to the through-opening and the support projection with at least one force component transversely to the load axis in the through-opening.

28. A trailer coupling for a motor vehicle comprising: a carrier assembly comprising a transverse carrier for arranging on the rear of a motor vehicle and a retainer retained on the transverse carrier for retaining a coupling element, of the trailer coupling, wherein the coupling element is provided for fastening a trailer or a load carrier, wherein the retainer is connected to the transverse carrier by a tension anchor of a tension anchor assembly, wherein the tension anchor penetrates the transverse carrier along a tension anchor load axis of the tension anchor and loads an abutment surface of the retainer, through which abutment surface the tension anchor load axis or an axis parallel to the tension anchor load axis passes, against the transverse carrier, wherein the retainer has at least one side support surface which projects in front of the abutment surface adjacent to the tension anchor and lies against the transverse carrier such that the retainer is supported on the transverse carrier laterally adjacent to the tension carrier with respect to a force acting transversely to the tension anchor load axis of the tension anchor, wherein the abutment surface holds more than 50% of the transverse carrier.

* * * * *